UNITED STATES PATENT OFFICE.

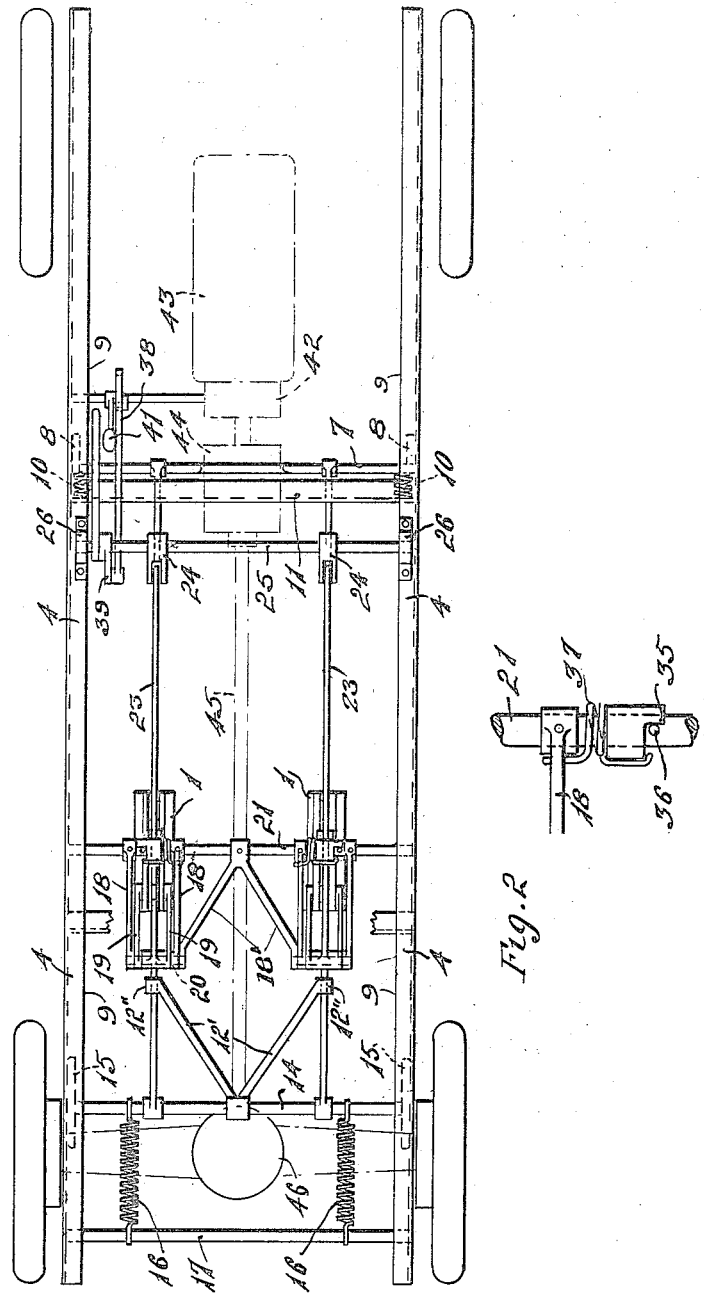

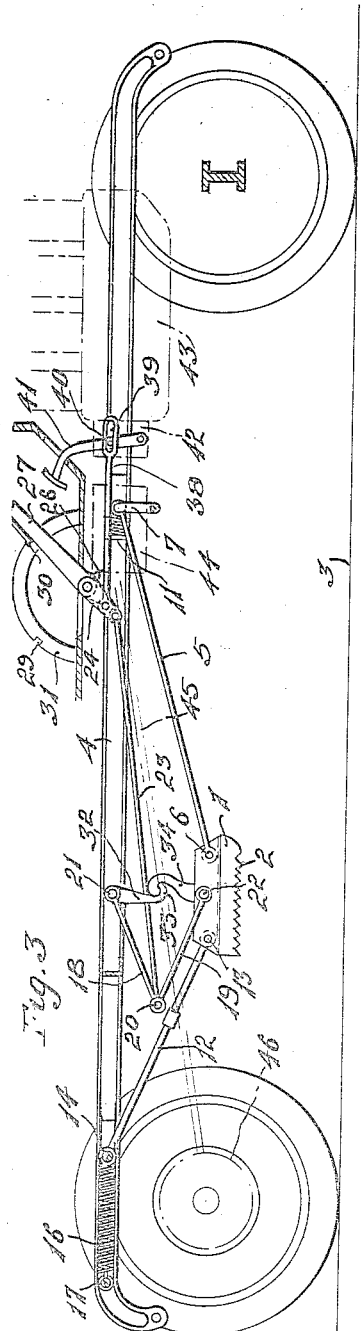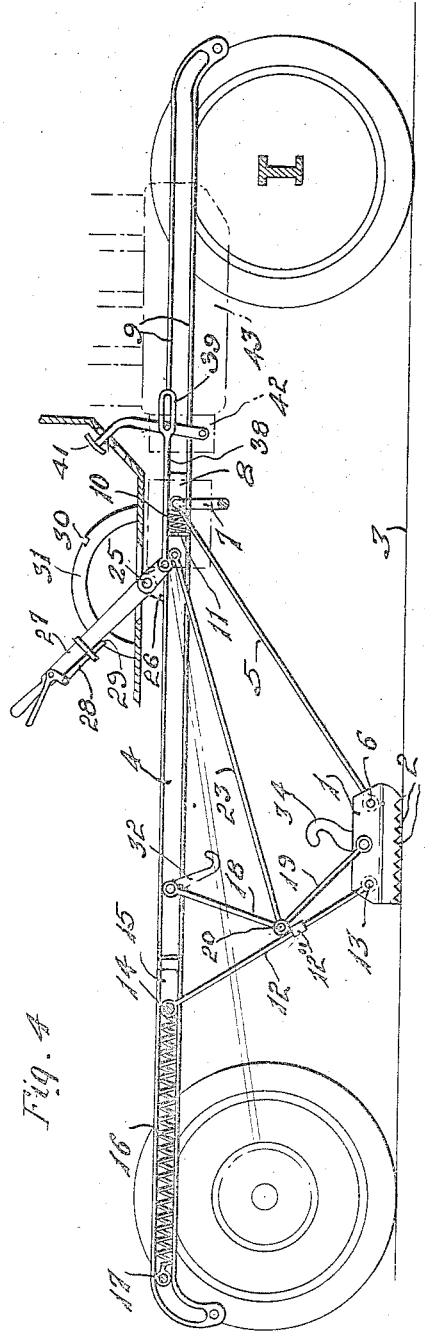

NATHAN R. DOROHON, OF McKEESPORT, PENNSYLVANIA.

VEHICLE-BRAKE.

1,282,054.

Specification of Letters Patent.

Patented Oct. 22, 1918.

Application filed March 20, 1918. Serial No. 223,623.

*To all whom it may concern:*

Be it known that I, NATHAN R. DOROHON, a citizen of the United States, residing at McKeesport, in the county of Allegheny and State of Pennsylvania, have invented certain new and useful Improvements in Vehicle-Brakes, of which the following is a specification.

This invention relates to vehicle brakes and more particularly that class of brakes used upon automobiles which serves both as a brake and skid preventing medium, and has for its principal objects; the provision of a braking mechanism that may be instantly applied when the emergency arises, to effect the quick stop of an automobile or prevent skidding upon slippery road surfaces; the provision of a brake mechanism that is so supported that the shock of a quick stop is readily absorbed; the provision of a brake mechanism that is both efficient and durable, and such other objects as will hereinafter appear. One embodiment of the invention is illustrated in the accompanying drawings, wherein—

Figure 1 is a plan view of the apparatus; Fig. 2 is an enlarged plan view of a portion of certain details of the mechanism; Fig. 3 is a side elevation of the device shown in Fig. 1; and Fig. 4 is a side elevation showing the parts in operative position.

Referring to the drawings, wherein the chassis of an automobile is shown as supporting the mechanism, the braking apparatus consists of a pair of brake shoes 1 provided on its lower face with serrations or teeth 2 adapted to frictionally engage the surface of the road 3 when the shoe is lowered into contact with the road. The shoes are attached to the frame members 4 of the automobile and held against longitudinal movement when in operative position, by means of the tension links 5 which are pivoted at their lower ends by the pivot pin 6 to the front ends of the shoes 1. The upper end of the tension links 5 are pivoted to a cross-head 7 which is provided with forwardly extending guide shoes 8 adapted to slide in the guides formed by the flanges 9 of the channel shaped frame members 4.

The cross-head 7 is normally yieldingly held in its forward position shown in the figures by means of compression springs 10 which are disposed between the cross-head 17 and a cross-channel 11 connecting the frame members 4. It will be seen from the foregoing that the shoes 1 are yieldingly attached to the frame members 4 so that when the shoe comes in contact with the surface of the road the shock incident to such contact will be absorbed by the springs 10.

The rear ends of the shoes 1 are supported by means of a pair of suspension links 12 which are pivoted by means of a pin 13 to the shoes 1 and at their upper ends are pivoted to a cross-head 14 having guide shoes 15 secured to the ends thereof, which shoes are adapted to slide in the guide formed by the flanges 9 of the frame members 4. The cross-heads are retained in their rear or retracted position by means of a pair of helical tension springs 16 secured at one end to the cross-head 14 and at the other end to the rear cross member 17 connecting the frame members 4.

When the springs 16 and 10 are in their normal position, the brake shoes 1 will be suspended beneath the frame of the automobile in the position indicated in Fig. 3. The brake shoe is adapted to be moved into operative position, as indicated in Fig. 4, by means of a set of toggle links 18 and 19, which are pivoted together by a shaft 20, the upper end of the links 18 being secured to a rocking shaft 21 which is pivoted between the frame members 4. The lower end of the toggle link 19 is pivoted adjacent the center of the brake shoe 1 by means of a pivot rod 22 passing through the upper portion of the brake shoe 1. By referring to Fig. 1, it will be seen that each brake shoe 1 is supported by a pair of the toggle links 18 and 19, the toggles being spaced apart so as to make a rigid construction that will resist any force tending to displace them laterally or in a direction transverse to the axis of the automobile.

The entire brake shoe structure is strengthened and supported against transverse lateral displacement by means of diagonal braces 12' and 18', the former, extending downward from the center of the cross-head 14 to a point 12'' where the braces are joined to the suspension rods 12, and the latter extending downward from the center of the rocking shaft to the shafts 20 of the toggle members. See Fig. 1. The brake shoes are connected directly by means of a transverse rod 22 extending from one shoe to the other and serving as a pivot connection for the toggle members 19.

The toggle links 18 and 19 are adapted to force the brake shoe 1 toward the surface of the road when the shaft 20 is drawn toward the rocking shaft 21, and this movement is accomplished by means of connecting rods 23 pivoted at one end to the shaft 20 of each pair of toggle members and at the other end to rocking levers 24 which are secured to an operating shaft 25 carried upon the frame members 4 by means of brackets 26. A brake lever 27 is secured adjacent one end of the operating shaft 25 and is adapted to be locked in operative and inoperative position by means of a latch mechanism 28 carried upon the handle 27. The latch is adapted to seat in notches 29 and 30 cut in the outer face of a sector 31 secured to the automobile in any suitable manner.

When the springs 16 have retracted the cross-head 14 so as to draw the brake shoes 1 into raised position, indicated in Fig. 3, the brake lever 27 will occupy the forward position indicated in Fig. 3. When it is desired to lower the brake shoe 1 into contact with the road the latch 28 is first pressed toward the handle of the lever 27 so as to withdraw it from the notch 30, after which operation the lever 27 is drawn rearwardly so as to straighten out the toggle members and thereby force the shoe 1 downward against the tension of the springs 16. When the lever 27 is in the position indicated in Fig. 4, the latch 28 will enter the notch 29 and hold it in braking position. The instant the brake lever 27 is released the tension springs 16 will retract the cross-head 14 thereby drawing the brake shoe again into the position indicated in Fig. 3. It is desirable, however, to releasably latch the brake shoe in this position and therefore a pair of latch hooks 32 are pivoted for limited rotary movement with respect to the rocking shaft 21 upon the said shaft, these hooks being provided at their lower ends with a turned-up hook 33 adapted to receive and retain hooks 34 rigidly carried upon the brake shoes 1.

Referring to Fig. 2 it will be seen that the latch hooks 32 are provided with an extension 35 adapted to engage a pin 36 mounted upon the rocking shaft 21. These latch hooks 32 are mounted adjacent the toggle links 18 carried by the shaft 21 and the latch hooks 32 are normally held in a predetermined position with respect to the rocking shaft 21 by means of springs 37 coiled about the shaft 21 and so attached to the toggle links 18 and the latch hooks 32 that the extensions 35 carried by the latch hooks 32 will engage the stop pins 36 which are secured to the rocking shaft 21. Therefore, when the latch hook 34, rigidly secured to the brake shoe 1, engages the under curved end of the hook 33, the latch hook 32 will be moved thereby toward the left or clockwise until the ends of the hooks pass each other. The hooks are automatically detached from one another when the connecting rod 23 is moved to the left.

It is desirable to disengage the driving clutch at the same time the emergency brakes are applied and for this purpose a clutch rod 38 is pivoted to the rocking lever 39 secured to the operating shaft 25 so that when the brake lever 27 is pulled to the left the clutch rod 38 will be moved toward the right. The free end of the clutch rod is provided with an elongated slot 39 through which a pin 40, carried by the clutch pedal 41, extends, so as to be operatively engaged by the clutch rod 38. Operation of the brake lever 27 to force the brake shoes 1 into engagement with the surface of the rod will at the same time actuate the clutch pedal 41 so as to move the clutch into disengaging position. The details of the clutch mechanism are not shown but the clutch is indicated in dotted lines at 42 and may be of any preferred form of construction that is adapted to be operated by a foot pedal.

As a means of indicating the relative position of the parts of the apparatus with respect to the parts of any standard automobile, the engine 43, the clutch 42, the gear box 44, the driving shaft 45, and the differential gear case 46 are all indicated in broken lines, and it will be seen that the braking apparatus is so positioned that it in no manner interferes with the present automobile standard equipment. While frame members, channel shaped in cross-section, are here shown in the drawings, it is obvious that other forms of frame members may be used, in which case special guides may be secured to the frames for supporting the cross-heads 14 and 7. It is obvious that many other changes may be made in the details of the construction without departing from the spirit of the invention and the invention is not limited to the specific structures herein shown and described.

What I claim is:

1. A braking mechanism for automobiles, comprising in combination a frame, a brake shoe adapted to be lowered into contact with the surface of the road, actuable means for lowering the shoe into contact with the road, and means for retracting the shoe comprising substantially horizontal guides channeled in said frame, a cross-head slidably mounted in the guides, yielding means normally holding the cross-head in retracted position, and a link connecting the cross-head with the shoe whereby the shoe is normally drawn upwardly by the yielding means, said cross-head movable forwardly in the guides when the lowering means is actuated.

2. A braking mechanism for automobiles, comprising in combination a frame, a brake shoe adapted to be lowered into contact with the surface of the road, actuable means for lowering the shoe into contact with the road, and means for retracting the shoe comprising a substantially horizontal guide formed in and constituting a part of said frame, a cross-head slidable forwardly in the guide when the lowering means is actuated, a spring normally holding the cross-head in retracted position, and a link pivotally connecting the cross-head with the shoe whereby the shoe is normally drawn upwardly by the spring.

3. A braking mechanism for automobiles, comprising in combination a frame, a brake shoe adapted to be lowered into contact with the surface of the road, a link connecting said shoe to the frame, means for lowering the shoe into contact with the road, and means for retracting the shoe comprising a substantially horizontal guide formed in said frame, a cross-head slidable forwardly in the guide, a spring normally holding the cross-head in retracted position, and a link pivotally connecting the cross-head with the shoe.

4. A braking mechanism for automobiles, comprising in combination a frame, a brake shoe adapted to be lowered into contact with the surface of the road, a link connecting said shoe to the frame, a shaft in said frame above said shoe, means on said shaft for lowering the shoe into contact with the road, and means for retracting the shoe comprising a substantially horizontal guide forming part of the frame, a cross-head slidable forwardly in the guide, yielding means normally holding the cross-head in retracted position, a link connecting the cross-head with the shoe whereby the shoe is normally drawn upwardly by the yielding means, and bracing means for said shoe mounted on said shaft.

5. The combination with an automobile frame formed of spaced parallel channel shaped frame members, of a cross-head adapted to be supported in the channels of the frame for longitudinal movement, and a brake shoe for engaging the surface of the road adapted to be retracted by movement of the cross-head with respect to the frame members.

6. The combination with an automobile frame formed of spaced parallel channel shaped frame members, of a cross-head adapted to be supported in the channels of the frame for longitudinal movement, a brake shoe for engaging the surface of the road adapted to be retracted by movement of the cross-head with respect to the frame, and a spring secured to the frame and the cross-head for retracting the cross-head.

7. The combination with an automobile frame formed of spaced parallel channel members, of a pair of cross-heads adapted to be slidably supported in the channels, and yieldingly held in a predetermined position with respect to the frame members, a brake shoe for engaging the surface of the road, links connecting the cross-heads with the shoe, and means for moving the shoe into contact with the road.

8. The combination with an automobile frame comprising spaced parallel frame members channeled to form guides, of a pair of parallel cross-heads slidably supported at their ends in said guides, and yieldingly held in a predetermined position with respect to said members, a brake shoe, disengageable coöperating latch members on said shoe and said frame, tension and suspension links connecting the cross-heads with the shoe, and means for moving the shoe into contact with the road upon disengagement of said latch members.

NATHAN R. DOROHON.